Figure 1:
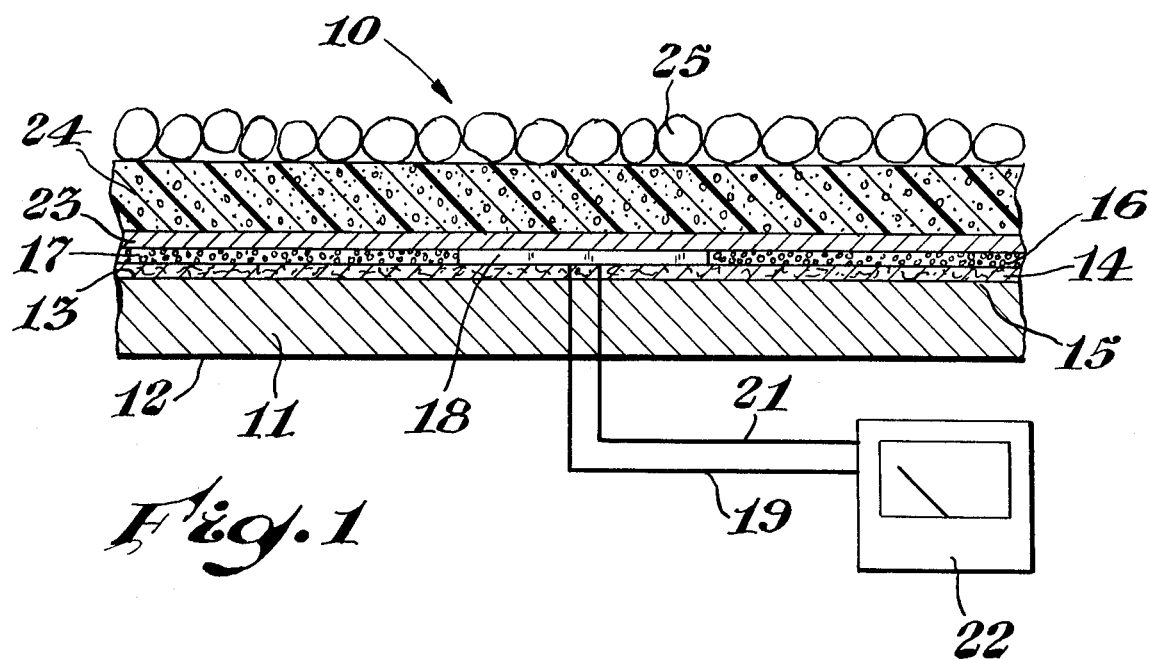

United States Patent [19]

Sheahan

[11] 4,110,945

[45] Sep. 5, 1978

[54] ROOF INSTALLATION FOR LOCATING WATER LEAKAGE POINTS

[75] Inventor: James P. Sheahan, Midland, Mich.

[73] Assignee: The Dow Chemical Company, Midland, Mich.

[21] Appl. No.: 720,935

[22] Filed: Sep. 7, 1976

[51] Int. Cl.² .................... E04D 1/00; E04D 13/00
[52] U.S. Cl. ............................ 52/173 R; 52/1;
200/61.05; 324/65 P; 340/602; 340/604
[58] Field of Search ............... 52/1, 173; 340/235;
200/61.05; 324/65 P

[56] References Cited

U.S. PATENT DOCUMENTS

| | | | |
|---|---|---|---|
| 362,010 | 4/1887 | Jewill | 340/235 |
| 2,668,202 | 2/1954 | Kaplan | 340/235 |
| 2,735,907 | 2/1956 | Inman | 200/292 X |
| 2,759,175 | 8/1956 | Spalding | 340/235 X |
| 3,252,155 | 5/1966 | Surtees et al. | 200/61.05 X |
| 3,383,863 | 5/1968 | Berry | 324/65 P |
| 3,882,476 | 5/1975 | Lofgren | 340/235 |

FOREIGN PATENT DOCUMENTS 579,700  7/1959  Canada .................... 52/173

*Primary Examiner*—Alfred C. Perham

[57] ABSTRACT

A plurality of water detectors are positioned under the water-impermeable membrane of a roof. In the event that the water-impermeable membrane is broken and the roof leaks, the general area of the leak can be determined.

4 Claims, 2 Drawing Figures

U.S. Patent    Sept. 5, 1978    4,110,945

ROOF INSTALLATION FOR LOCATING WATER LEAKAGE POINTS

Roofing over the years has been subject to many difficulties. A particularly desirable and economical variety of roof is the so-called built-up roof wherein the water-impermeable membrane is positioned over a roof deck and layers of gravel or gravel and insulated material are disposed adjacent the water-impermeable membrane. Such roofs are generally so-called flat roofs, that is, roofs having very small or no pitch. A variety of water-impermeable membranes are used including layers of bituminous material and roofing felt, plastic film or sheet, and the like. Such roofs are generally highly satisfactory until the water-impermeable membrane breaks and the roof leaks. Oftentimes, the location of water entering the interior of the building can be readily determined, but due to the generally planar nature of such roofs, water can travel a considerable distance over the roof deck or other layers of roofing before entering the building. Various means have been devised to attempt to detect the water under the roofing with varying degrees of success. Such detection is complicated by the fact that it is desirable to determine the location of the leak as rapidly as possible and prevent further water from entering the building. Generally such water is the result of rain and there is considerable water within the gravel on the top surface of the roof or in the case of certain thermally insulated roofs wherein the water-impermeable membrane lies below the thermal insulation, the roof must be allowed to dry prior to searching for the leak. The problem of locating a roof leak is particularly difficult in a roof that has been reroofed. By the term "reroofed" is meant that a roof is installed over and without the removal of an existing roof. Thus, one has a newly installed water-impermeable membrane over an older membrane that has failed. If the newly installed membrane ruptures, it is extremely difficult to determine the location of the rupture from the point of entry of water into the building.

It would be desirable if there were available a roof in which leakage could be readily localized.

It would also be desirable if there were available a leak detection system for a roof which did not require inspection of the entire roof area to determine the location of the leak.

It would also be desirable if there were available an improved flat roof in which leaks could be readily localized.

These benefits and other advantages in accordance with the present invention are achieved in a roof structure, the roof structure comprising at least a roof deck, a water-impermeable membrane disposed over the roof deck, means to maintain the water-impermeable membrane in a desired position on the roof deck, the roof having an upper surface and a lower surface, a plurality of water-sensing elements disposed beneath the water-impermeable membrane and adjacent the roof deck, connecting means leading from said water-sensing elements whereby an instrument in connection with said sensing means can be employed to determine if the individual sensing means are in contact with water.

Figure 2:
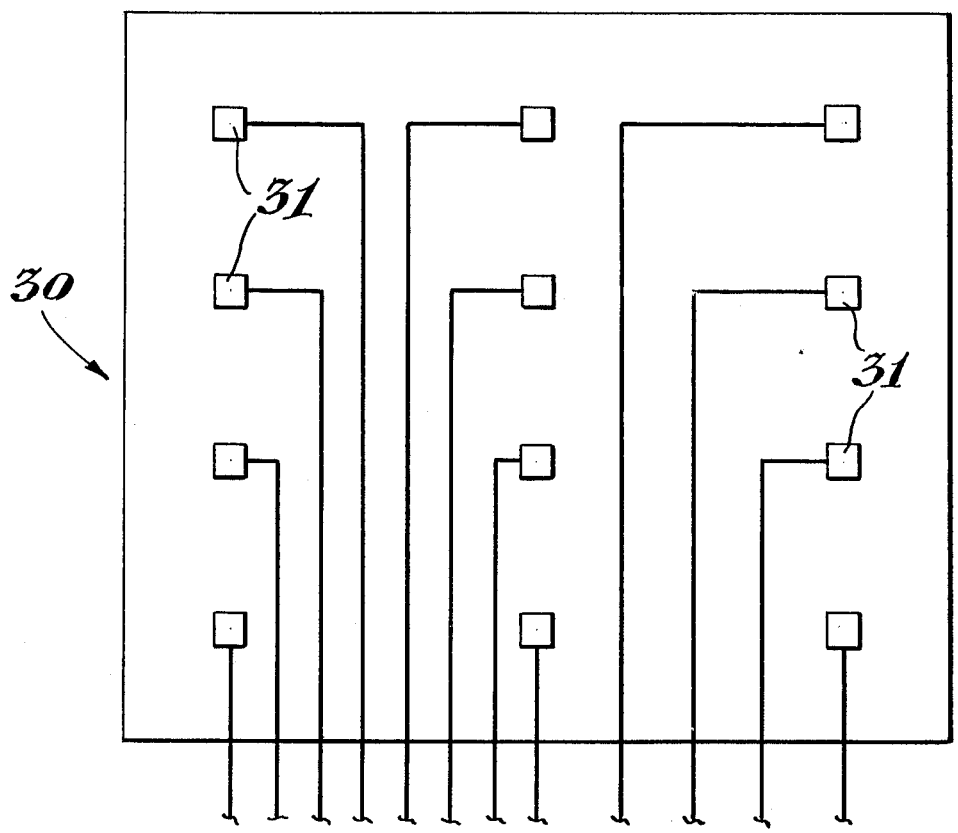

Further features and advantages of the present invention will become more apparent from the following specification taken in connection with the drawing wherein:

FIG. 1 is a schematic sectional view of a portion of a roof in accordance with the present invention; and FIG. 2 is a schematic representation of one disposition of water-sensing elements on a roof and their connecting means.

In FIG. 1 there is schematically depicted a partial sectional view of a reroofed roof in accordance with the present invention generally designated by the reference numeral 10. The roof 10 comprises in cooperative combination a roof deck 11, the roof deck 11 having a lower surface 12 and an upper surface 13. A used, no longer serviceable, roof membrane 14 is disposed on the upper surface 13 of the roof deck 11. The membrane 14 can be of any conventional construction including layers of roofing felt and bitumen plastic sheets and the like. The membrane 14 has a lower surface 15 and an upper surface 16. Disposed on the upper surface 16 of the membrane 14 is a layer 17 of small gravel. A water-sensing element 18 is disposed on the no longer serviceable membrane 14. The water-sensing element 18 is of the conventional electrical type such as disclosed in U.S. Pat. Nos. 2,668,202; 2,735,907; and 3,882,476; the teachings of which are herein incorporated by reference thereto. The sensing element has connecting means or wires 19 and 21 which are in operative detachable connection with an instrument 22 which indicates the presence or absence of water on the water sensor 18. A water-impermeable membrane 23 is disposed on the layer 17 of the roof deck 11 and covers the sensor 18. A layer of closed-cell foam insulation 24, such as plastic foam, glass foam and the like, is disposed over the water-impermeable membrane 23 and a layer of gravel 25 is disposed over the layer 24 of foam insulation, the weight of the gravel being sufficient to maintain the membrane 23 and layer 24 in a desired position on the roof.

In FIG. 2 there is schematically depicted a roof generally designated by the reference numeral 30. A plurality of individual spaced apart water-sensing means 31 are positioned on the roof beneath the water-impermeable membrane. The squares, some of which are designated by the reference numeral 31, indicate the location of water sensors such as the sensor 15 of FIG. 1. The lines extending from the sensors 31 and terminating at a location external to the roof 30 at the bottom of FIG. 2 schematically depict the leading of the connecting means from the various sensors to a location such as within the building where they can, in turn, be connected to an appropriate instrument to determine if water is present at any one or more of the various locations. The number and variety of water-sensing means disposed in a roof in accordance with the present invention will depend upon the precision desired in locating the leak and the long term reliability of the system. Generally for most applications, if sensors are disposed on ten-foot centers, adequate localization of the leak is obtained at minimal expense.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a roof structure, the roof structure comprising a roof deck, a water-impermeable membrane disposed over the roof deck, a means to maintain the water-impermeable membrane in a desired position on the roof deck, the roof having an upper surface and a lower surface, a plurality of individual spaced apart water-sensing elements disposed beneath the water-impermeable membrane and adjacent the roof deck, individual connecting means leading from said water-sensing elements whereby an instrument in connection with said sensing elements can be employed to determine if the individual sensing elements are in contact with water.

2. The roof structure of claim 1 having an unserviceable roofing beneath the water-impermeable membrane.

3. The roof structure of claim 1 wherein closed-cell plastic foam is disposed over the water-impermeable membrane and a layer of gravel disposed over the foam.

4. In a method for the preparation of a roof structure wherein a water-impermeable membrane is disposed over a roof deck and the membrane held in a desired position on the roof deck, the improvement which comprises providing a plurality of individual spaced apart water-sensing elements beneath the water-permeable membrane and providing individual connecting means leading from said water-sensing elements whereby an instrument in connection with said sensing elements can be employed to determine if the individual sensing means are in contact with water.

* * * * *